Dec. 15, 1942. J. C. ENGLISH 2,305,242
IGNITION AND CONTROL MEANS FOR FLUID FUEL BURNERS
Filed Aug. 30, 1939 3 Sheets-Sheet 1

INVENTOR.
JOHN C. ENGLISH
BY Flournoy Corey
ATTORNEY.

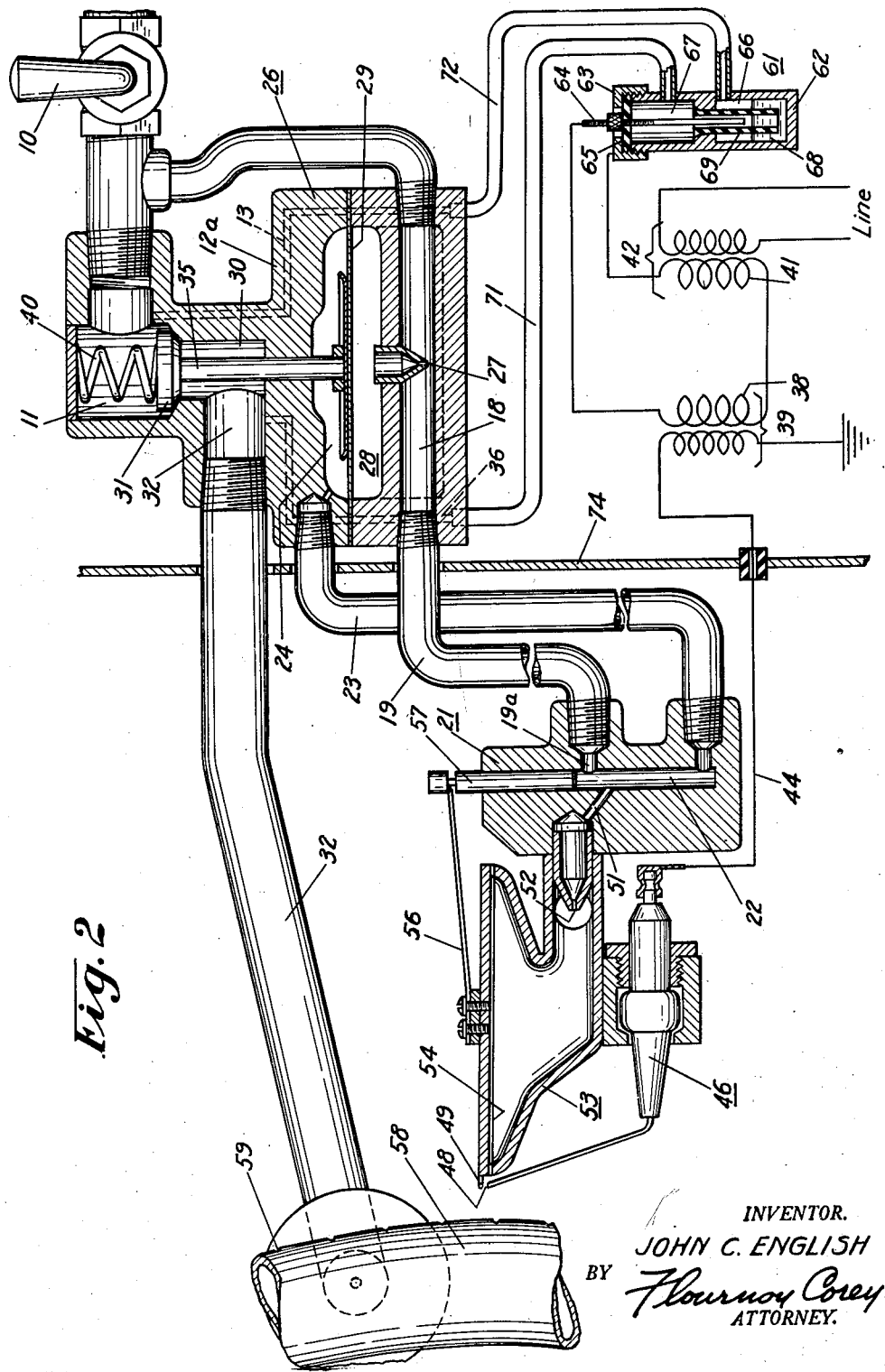

Dec. 15, 1942.  J. C. ENGLISH  2,305,242
IGNITION AND CONTROL MEANS FOR FLUID FUEL BURNERS
Filed Aug. 30, 1939  3 Sheets-Sheet 3
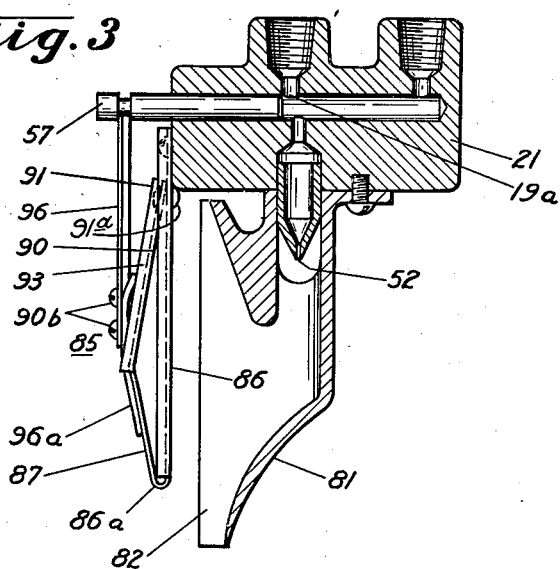
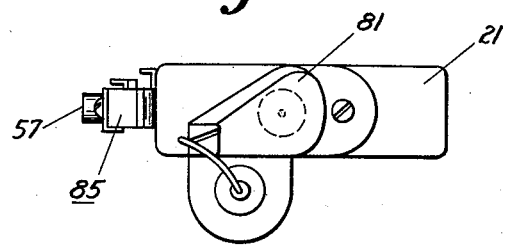
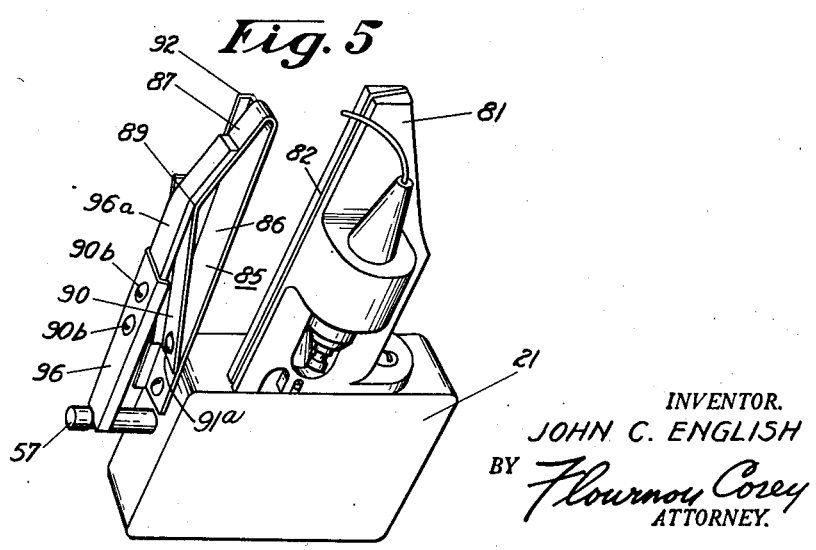
INVENTOR.
JOHN C. ENGLISH
BY Flournoy Corey
ATTORNEY.

Patented Dec. 15, 1942

2,305,242

UNITED STATES PATENT OFFICE 2,305,242

IGNITION AND CONTROL MEANS FOR FLUID FUEL BURNERS

John C. English, Cedar Rapids, Iowa, assignor to Johnson Gas Appliance Company, Cedar Rapids, Iowa, a corporation of Delaware Application August 30, 1939, Serial No. 292,693

12 Claims. (Cl. 158—117.1)

This invention relates to fluid fuel burners and has particular relation to an ignition and control means for such burners. This is a continuation in part of my co-pending application Serial No. 281,549.

It is one of the main objects of my invention to provide instantaneous electric ignition for gas burners of ovens and the like which will furnish ignition every time the gas is turned on. For instance, a housewife, in using an oven equipped with the electric ignition systems known to the art, may finish a cooking operation, turn off the gas, then decide to begin a second cooking operation and turn the gas on again without waiting for the various thermostatically controlled devices to cool, in which case a considerable quantity of gas may issue before the ignition system becomes operative so that when the gas is ignited an explosion results.

It has been found also that when a thermostatic element is subjected to heat from an oven or the like, its adjustment will often-times vary, because the valve or other device which the thermostat controls strikes a stop in its movement, thus setting up stress in the thermostat element. Because of the heat and the stress, the thermostat element may take a new "set," thus changing its adjustment.

It has also been found that in the use of conventional constantly burning pilot lights, when the oven regulator is set at a minimum requirement, as for instance 250 degrees, the heat from the pilot light may raise the temperature of the oven above the minimum temperature set, since the oven regulator has no control over the fuel passing through the pilot burner.

It is therefore among the objects of my invention to overcome the difficulties above pointed out and to provide a means of instant ignition every time the gas is turned on which means need not cool and re-cycle to provide ignition.

Another object of my invention is to provide a thermostatically controlled fluid fuel control means in which no stops or the like are employed, and which will not change its adjustment when subjected to heat over a period of time.

Another object of my invention is to provide means to supply only the minimum flow of fuel necessary to maintain the pilot light so that the heat from the pilot burner will not cause the oven or other enclosure to be heated beyond the minimum demands as set by the oven regulator.

Another object of my invention is to provide, in a control system, ignition means which are operative only when needed.

A still further object of my invention is to provide means capable of utilizing small differences of gas pressure in conjunction with a thermostatic element for controlling the flow of fuel to a burner and for controlling the ignition means for such burners.

Another object of my invention is to provide an electrical ignition system and control means so constructed that the control system will still function during current failure by lighting the pilot burner with a match.

Another object of my invention is to provide, in connection with a control and ignition system for gas burners, a throttling device which requires no vents of unburned gas or gas which is not supplied to a burner port.

Still another object of my invention is to provide a device in which the sensitive control means may be located outside the oven.

Other and further features and objects of the invention will be more apparent to those skilled in the art upon a consideration of the accompanying drawings and following specifications, wherein are disclosed several exemplary embodiments of the invention with the understanding, however, that such changes may be made therein as fall within the scope of the appended claims, without departing from the spirit of the invention.

In said drawings:

Figure 2 is a schematic diagram illustrating substantially the same structure shown in Figure 1 but utilizing a pressure responsive mercury switch instead of a diaphragm for controlling the electric circuit.

Figure 3 is a horizontal view in section of a throttling device and thermal element constructed in accordance with another embodiment of my invention.

Figure 4 is an end view in elevation of the device shown in Figure 3 and

Figure 5 illustrates the appearance of the device shown in Figures 3 and 4 as viewed from below.

Figure 1:
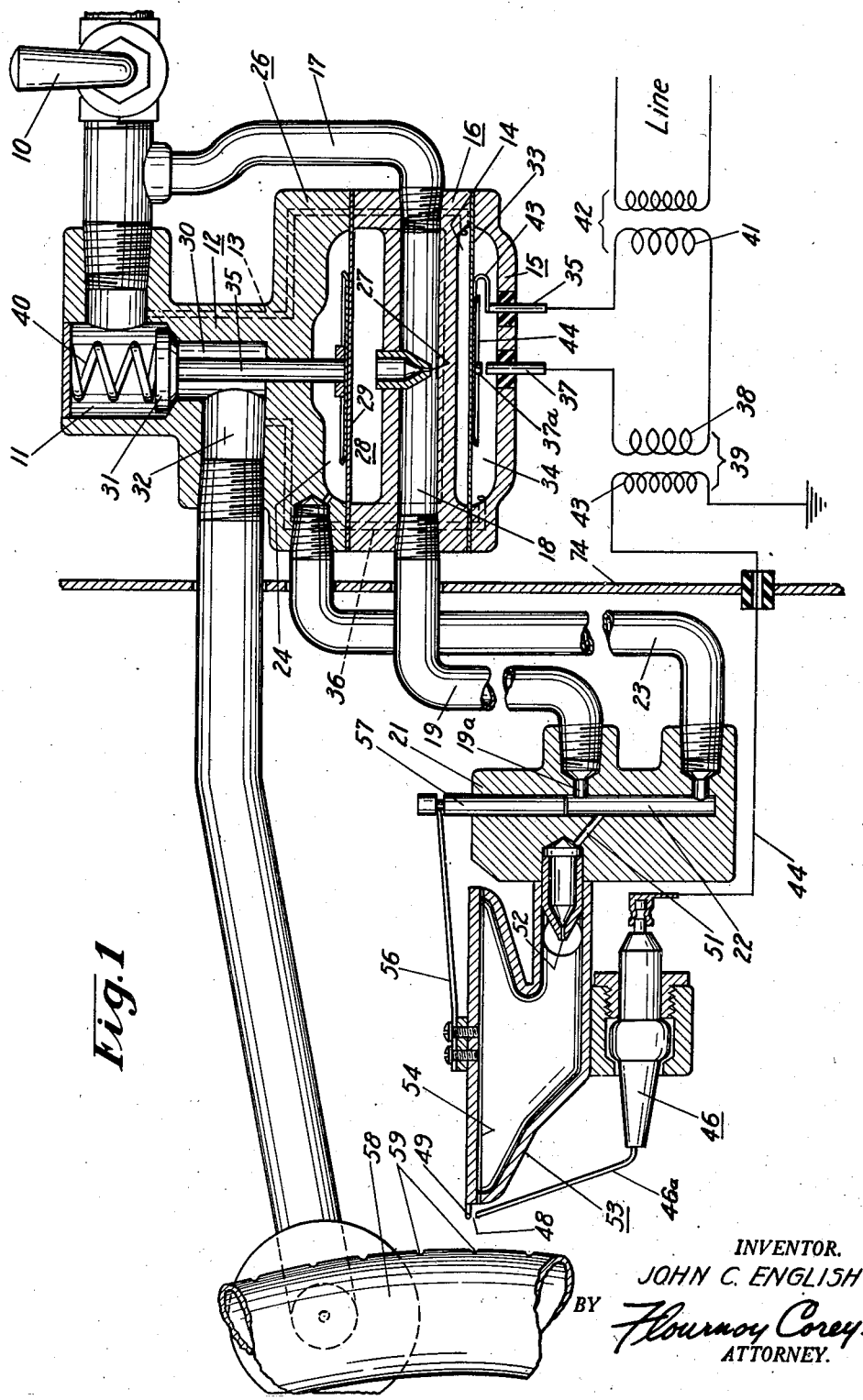
Figure 1 is a schematic diagram illustrating one embodiment of my invention and in which a diaphragm is utilized for controlling the electric circuit.

A device constructed according to a preferred embodiment of my invention includes a diaphragm actuated main or fuel flow control valve, illustrated at 12, an ignition control device, one of which is illustrated in Figure 1 at 16, a pilot burner or sub-burner 53, a pilot burner thermostat element 56, a throttling means, the housing of which is shown at 21, for controllng the fuel flow control valve, and ignition means 46. The structure of a preferred embodiment of my invention may be better understood by explaining the operation of the device.

Referring now more particularly to Figure 1; in the control system here shown, when the main control valve 10 is opened, gas flows into the upper chamber 11 of the flow control means, indicated generally at 12, and also through the small channel 13 into the upper chamber 14 of a diaphragm actuated switch, the housing of which is indicated at 16.

At the same time gas flows through the conduit 17 and through the channel 18, through conduit 19 and into the pilot thermostat or throttling valve housing 21. Gas flows through the bore 22 of the housing 21, back through the conduit 23, and into the upper chamber 24 of the diaphragm actuated control valve, the housing of which is indicated at 26. Gas also leaks slowly from the conduit 18 in the housing 26, through the pin point opening or tapered orifice 27, and into the lower chamber 28 below the diaphragm 29.

So long as the valve 31 is closed, the chamber 34 below the diaphragm 33 is at atmospheric pressure, since the bleeder channel 36 communicates with the fuel supply line 32 which is open to atmosphere.

It is to be noted, then, that when the valve 10 is initially opened, gas immediately flows through channel 13 to chamber 14 and there is an excess of pressure in the chamber 14 of the diaphragm-actuated ignition control means 15 over the atmospheric pressure in chamber 34.

Inasmuch as the chamber 14 is at a pressure higher than atmospheric, as soon as the valve 10 is opened the diaphragm 33 is moved downwardly and the contact 37a strikes the contact 37 to close an electrical circuit through the primary 38 of the high voltage ignition coil 39, through the secondary 41 of the step-down transformer 42, and through the spring 43 and the metallic portion 44 of the diaphragm.

The primary coil of the step-down transformer 42 may be connected to any suitable current supply, as for instance the house wiring circuit. The voltage at the contacts 37a and 37 is low— on the order of 18 to 20 volts. The primary side of the step-down transformer 42 is constantly energized. However the electrodes 37a and 37 are preferably well insulated from the housing 15 so that house current may be used directly, if desired, for energizing the primary of the ignition coil 39.

The closing of the contacts 37a and 37 energizes the high voltage side 43 of the ignition transformer 39 and furnishes high voltage current through the connection 44 to the electrode of the spark plug 46. The electrode 46a conducts the high voltage current to the gap 48 where it jumps the gap to the grounded electrode 49.

The gas in the conduit 22 of the pilot burner housing 21 also flows through the channel 51 and through the orifice 52 into the pilot burner housing 53 where it issues through the slot 54.

The spark at the gap 48 ignites this gas issuing from the slot 54 and heats the thermostat 56. The thermostat 56, when sufficiently heated, will drive the loosely seated plug or valve 57 downwardly to at least partially close off or throttle the gas passing into the channel 22 through the port 19a. This means that the conduit 18 and the chamber 28 below the diaphragm 29 will remain at above atmospheric pressure—that is, at the pressure of the gas supply, but because the chamber 24 communicates with atmosphere through conduits 23, 22, 51, orifice 52, and pilot light burner or sub-burner 53, the chamber 24 will attain a pressure between atmospheric and supply line pressure.

This will, then, cause movement of the diaphragm 29 upwardly to raise the valve 31 from its seat to permit gas at supply line pressure to pass into the supply line conduit 32 and to the main burner 58. The gas issuing from the ports 59 of the main burner will be ignited by the burning gas of the pilot burner, and ignition of the main burner is completed.

Inasmuch as gas is now flowing from the chamber 11 into the conduit 32, the pressure above and below the diaphragm 33 is equalized through the conduits 13 and 36 and the diaphragm 33 moves upwardly to its normal position so that the circuit between the contacts 37a and 37 is broken and the ignition coil is de-energized.

Suppose, now, that the handle 10 is closed. Of course all gas bleeds out of the supply pipe 32 and the chambers 24, 28, 18, 14 and 34. Also the gas bleeds out of the bore 22 of the pilot burner housing. The spring 40 closes the valve 31. The system is now ready for re-ignition.

The gas may escape from the chamber 28 more rapidly than when entering the chamber because the tapered port permits gas to flow out more rapidly than the gas can find its way into the chamber. Thus the valve 31 will close more rapidly than it opens.

Suppose, however, that the thermostat 56 is still hot enough that the throttling plunger 57 covers the port 19a. Then suppose the valve 10 is opened. Gas will flow into the conduit 18 and chamber 28. The valve 31 will be raised slowly by the gas issuing through the fine port 27 but gas also flows into the chamber 14, through the bore 13, so that the contacts 37a and 37 are closed and the ignition system will be energized to ignite the gas issuing from the ports 59 of burner 58.

The raising of the valve 31 is slow but operation of the ignition switch at 16 is rapid by reason of the greater diameter of the gas passage 13 over the bleeder port 27 and also by reason of the lesser inertia of the parts of the ignition switch in relation to those of the gas flow control valve. The greater volume of the chamber 28 over chamber 14 also makes the operation of valve 31 slower than the operation of the ignition switch. Thus ignition will occur at the gap 48 before gas flows into the main burner 58.

Ignition continues after the gas starts flowing from the main burner and continues until the pressure on the opposite sides of the diaphragm 33 is substantially equalized to thus insure ignition of the pilot burner and main burner.

Thus it will be seen that ignition is furnished to the burner each time the gas is turned on whether the parts of the device are hot or cold.

In Figure 2 substantially the same diaphragm actuating control valve 12a is employed and the pilot burner thermostat structure 21, the pilot burner 53, and ignition means 46 are the same as in Figure 1. However the device shown in Figure 2 employs a mercury switch constructed according to my co-pending application Serial No. 281,549.

This structure is indicated generally at 61 and is comprised of a cylindrical housing 62 closed by means of a threaded cap 63. An electrode 64 projects down through the cap and through a sealing means 65.

The interior of the casing 62 is divided into a lower chamber 66 and an upper chamber 67. The lower chamber is partially sealed with mercury or like conducting fluid indicated at 68, and a cylindrical channel member 69 surrounds the lower end of the conductor 64 and extends from the upper chamber 67 down into the lower chamber 66 below the level of the mercury 68. Conduits 71 and 72 are connected respectively to the upper chamber 67 and the lower chamber 66 and are connected in turn with the bores or channels 36 and 13 of the housing 26.

It is apparent that if pressure is applied to the conduit 72, as for instance by opening the valve 10 leading into the chamber 11 of housing 26, the liquid in the chamber 66 outside the conduit 69 will be depressed to raise the level of the liquid within the conduit 69 so that a circuit is completed through the electrode 64, the liquid 68, and the housing 62 to thus close the circuit whereby the primary 38 of the ignition transformer 39 is energized from the secondary 41 of the step-down transformer 42 to thus cause an electric discharge at the spark gap 48.

It is to be noted that as soon as the gas issuing from the orifice 52 is ignited at the pilot burner slot 54, the thermostat 56 will cause closing of the port 19a by the plunger 57 to cut off or materially reduce the flow of gas through the conduit 23 into the upper chamber 24 of the control valve. As soon as this occurs the excess of pressure in the lower chamber 28 causes raising of the valve 31 to permit gas to flow through the conduit 32 into the burner 58.

If, now, the handle 10 is turned to the off position cutting off the flow of gas to the burner 58 and the handle is then quickly opened again before the thermostat 56 cools, the difference of pressure between the conduits 13 and 36 will again raise the level of the mercury inside the tube 69 to energize the ignition system. Thus ignition is afforded at all times and the ignition will occur instantly as soon as the handle 10 is opened and will be automatically cut off when the pressure is substantially equalized on the two sides of the main flow control valve.

The operation of my control system may be analyzed in one way as follows: After the gas is turned on at the handle 10 the entire system, with the exception of the supply pipe 32 and the chamber 34 below the ignition switch, fills with gas. The ignition switch is closed by the pressure of gas in the chamber 14. Gas discharges from the system through the pilot burner nozzle 52 and this nozzle is, for the moment, the element which determines the rate of flow through the pilot burner and the pressure within the upper chamber 24 of the flow control valve 12. The jet 52 is the "bottle neck" of the system. The gas issuing from the pilot burner is ignited by the spark at 48 and begins burning.

But as soon as the thermostatic strip 56 is sufficiently heated, a new condition of the system is established. The plunger 57 closes or partly closes the port 19a and throttles the gas passing through this port. The port 19a now becomes the "bottle neck." Gas passing through the loop formed from chamber 28 to chamber 24 by the conduits 19, 22, and 23 is throttled to thus reduce the pressure in the chamber 24 and open the valve 31. The partial closing of the port 19a also limits flow through the jet 52.

Thus the thermostat and plunger effect a change of control between the jet 52 and port 19a to control the operation of valve 31.

I have illustrated in Figures 3 to 5, inclusive, a control having as a part thereof a modified form of thermal element, which operates in substantially the same manner as the element 56 shown in Figures 1 and 2 but has greater sensitivity.

The throttling valve housing 21, plunger 57, and orifice 52 may be substantially the same as in the embodiments shown in Figures 1 and 2. The unit preferably is adapted to be used in a horizontal plane as shown in Figure 4. The pilot burner housing 81 is supplied with a slot 82 arranged to direct the pilot flame laterally and downwardly so as to wipe upwardly against the inner side of the thermal element 85.

The thermal element 85 is, in a preferred form, comprised of at least two metal strips so arranged and positioned with respect to the pilot flame as to be heated unevenly by the flame. The thermal element may be comprised of a "rigid" leg, such as the leg 86, and a "flexible" leg 87—90. In the preferred structure here shown, a single strip of metal, such as stainless steel or the like, is employed, and this strip is bent back upon itself to form an acute angle with itself as at 86a. The leg 86 is preferably stiffened by means of a flange 92.

The flexible portion of the element is comprised of the short leg 87 and the long leg 90. The junction of the short and long legs form a sort of hump as of 89. The extreme ends of the metal strip are riveted as at 91a or otherwise fastened together at 91 at which point the thermal element is fastened to the housing 21 of the throttle valve. The plunger 57 is actuated by means of a lever 96 attached to the portion of the thermal element which is subjected to the greatest bending. In this instance, the lever is fastened to the short leg 87. The long leg 90 is preferably reenforced or stiffened as by means of a flange 93.

The lever 96 includes a short curved member 96a to which the lever proper is secured as by screws 90b. Adjustment of the position of the plunger 57 with respect to the port 19a is secured by adjusting the screws 90b to rock the lever arm 96 on the short curved portion 96a.

The operation of this thermal element is as follows: When the pilot flame is ignited, the flame wipes upwardly over the portion or leg 86 thus heating and lengthening it. The portions 86 and 87—90 do not receive a proportionate amount of heat and therefore do not expand or lengthen to the same extent. The lengthening of the leg 86 tends to flatten out the hump 89 and thus move the outer end of the arm 96 toward the housing to partially close the port 19a.

It is obvious that a small quantity of gas should be permitted to pass through the port 19a at all times so as to maintain at least a small pilot flame whenever the device is in operation.

This last described thermal element is very sensitive and rapid in action at any oven temperature. When the pilot burner is lighted or extinguished only on the order of 5 seconds is required to provide sufficient movement of the thermal element to effect complete throttling operation.

The sensitive fuel flow control means and ignition control means may be located outside the oven, the wall of which is indicated at 74, so that they are not exposed to the oven heat. The parts subjected to oven heat will not be affected by this heat and this is true of the throttling means which I have devised in connection with my fuel flow control means. There is no stress set up in the thermostat element at any time.

The control and ignition means are instantly operative and will immediately re-cycle as soon as gas is supplied to the system. Explosions are thus impossible. The throttling valve or plunger 57 will control the flow of gas to the pilot burner and maintain it at a minimum because if the thermostatic element becomes too hot the plunger is driven further into the channel 22 to reduce the flow of gas to the pilot burner. If the thermostatic strip cools, the plunger uncovers some of the port 19a and the flow of gas to the pilot burner is increased. Friction of the throttling means is minimized. Very small differences of pressure will operate the control system.

My control system, in one sense, is a hydraulic system of control. Heated gas, of course, expands or takes on higher pressures and my system of control may make use of these higher pressures for actuating the mechanism. For instance the gas in the chambers of the pilot burner valve and in other parts may be exposed to heat and the increased pressure of the gas will actuate the mechanism. This action supplements the action of gas flow through the control system and under some circumstances will of itself actuate the control system.

Although I have described several embodiments of my invention, it is apparent that modifications thereof may be made by those skilled in the art. Such modifications may be made without departing from the spirit and scope of my invention as set forth in the appended claims.

I claim as my invention:

1. In a fluid fuel control means, the combination of a main burner, a diaphragm actuated fuel flow control valve, a supply line for the valve, a conduit means for conducting fluid fuel under pressure from the supply line to an opening-pressure chamber and to a closing-pressure chamber on opposite sides of the diaphragm of the valve, a pilot burner connected to receive fuel from the conduit means leading to the closing-pressure chamber, a throttle valve connected in the same conduit as the pilot burner and ahead of the pilot burner, whereby pressure of the fluid fuel on the closing-pressure side of the diaphragm of the valve may be relieved, to permit the valve to open, and the fuel supply to the pilot burner reduced, and means operatively connected with the throttle valve comprising a thermal element disposed adjacent the pilot burner whereby heat from the pilot burner will actuate the thermal element to cause the throttle valve to cut down the pressure in the closing-pressure chamber.

2. In a control means for gas burners, a main valve, valve actuating means mounted in connection with the main valve the valve having an opening-pressure chamber on one side of the actuating means and a closing-pressure chamber on the opposite side, the said actuating means being yieldable under a differential of pressure upon oppositie sides thereof to open the valve, conduit means for conducting gas from the inlet side of the main valve to the chambers on both sides of the valve actuating means, a throttling means and a pilot burner connected in series in the conduit leading to the closing-pressure chamber, the said throttling means including a body portion having a cylindrical opening therein, the said cylindrical opening having inlet and outlet ports and a pilot burner port, a plunger slideable within the cylindrical opening to increasingly cover the inlet port from fully opened to substantially closed condition, and thermal means connected with the plunger and operable, upon being heated by the pilot burner, to move over the inlet port of the throttling means, whereby the gas pressure in the closing-pressure chamber on one side of the valve actuating means and on the pilot burner will be simultaneously decreased.

3. In a fluid fuel burner, a supply line, a control valve, a main burner, means for normally maintaining the valve in closed position, valve actuating means mounted in connection with the control valve and yieldable, under a differential of pressure upon opposite sides of the actuating means to open the valve, means for conducting fluid fuel from the supply line to opening-pressure and closing-pressure chambers on opposite sides of the said actuating means, and means for relieving the fuel pressure in the closing-pressure chamber for causing a differential of pressure on opposite sides of the said actuating means comprising a pilot burner, means for throttling the fluid fuel to the pilot burner and the fuel pressure within the closing-pressure chamber simultaneously, means for venting the fluid fuel, from the closing-pressure chamber, through the pilot burner, and heat sensitive means, disposed to be actuated by heat from the pilot burner, connected with the throttling means whereby an increase in the throttling effect thereof is secured upon increased heating of the heat sensitive means.

4. In a gas burner, a supply line, a main control valve including a housing having inlet and outlet ports, valve actuating means connected with the valve, two chambers in the casing on opposite sides of the valve actuating means, the control valve adapted to be opened by an increase of pressure in the first of said chambers over the pressure in the other chamber, conduit means for conducting gas from the supply line to the first of said chambers for opening the valve, means for restricting the flow of gas through said conduit means to delay the opening of the valve, conduit means for conducting gas from the supply line to the second of said chambers for preventing the opening of the valve, a pilot burner, a throttle valve connected in the conduit means leading to the second chamber, and a thermal element connected with the throttle valve adapted to be actuated by heat from the pilot burner to throttle down the gas supply to the second chamber to permit gas pressure in the first chamber to open the valve after the pilot burner is ignited.

5. In a gas burner, a supply line, a main control valve including a housing having inlet and outlet ports, valve actuating means connected with the valve, two chambers in the casing on opposite sides of the valve actuating means, the control valve adapted to be opened by an increase of pressure in the first of said chambers over the pressure in the other chamber, conduit means for conducting gas from the supply line to the first of said chambers for opening the valve, means for restricting the flow of gas through said conduit means to delay the opening of the valve, conduit means for conducting gas from the supply line to the second of said chambers for preventing the opening of the valve, a pilot burner, a throttle valve connected in the conduit means leading to the second chamber, and a thermal element connected with the throttle valve adapted to be actuated by heat from the pilot burner to throttle down the gas supply to the second chamber to permit gas pressure in the first chamber to open the valve after the pilot burner is ignited, the second chamber of the valve connected to the pilot burner so as to discharge gas from the said chamber through the pilot burner when the conduit leading to the second chamber is throttled.

6. In a control system for gas burners, a main valve, a diaphragm for actuating the main valve, means normally urging the valve closed, a pilot burner, a conduit for conducting gas from the intake side of the main valve to the pilot burner and to one side of the diaphragm, the conduit to the diaphragm having a restricted port therein, a gas jet in the pilot burner for normally limiting the flow of gas from the conduit through the pilot burner, and means, comprising a throttling valve in the conduit leading to the pilot burner, for further limiting the flow of fuel through the pilot burner jet to thus increase the back pressure within the conduit and cause gas to flow through the restricted port to the diaphragm to open the main valve.

7. In a control system for gas burners, a main valve, a diaphragm for actuating the main valve, means normally urging the valve closed, a pilot burner, a conduit for conducting gas from the intake side of the main valve to the pilot burner and to one side of the diaphragm, the conduit to the diaphragm having a restricted port therein, a gas jet in the pilot burner for normally limiting the flow of gas from the conduit through the pilot burner, means, comprising a throttling valve in the conduit leading to the pilot burner, for further limiting the flow of fuel through the pilot burner jet to thus increase the back pressure within the conduit and cause gas to flow through the restricted port to the diaphragm to open the main valve, and a thermal element adapted to be actuated by heat from the pilot burner and operatively connected with the throttling valve to increasingly close said throttling valve upon increased heating effect of the pilot burner flame upon the thermal element.

8. In a control means for gas burners, a service valve, a main valve, means for biasing the main valve toward a normally closed position, valve actuating means connected to the valve and yieldable under a differential of pressure upon opposite sides of the actuating means to open the valve, a pressure chamber adjacent each side of the valve actuating means, means for conducting gas from the intake side of the valve to both pressure chambers, a pilot burner connected with one of the pressure chambers whereby gas supplied to the pilot burner will be at substantially the same pressure as in the connected pressure chamber, a throttle valve disposed in one of the gas conducting means to reduce the pressure of the gas supplied to the pilot burner and the connected chamber, and a thermal element disposed so as to be subjected to the heat of the pilot burner and operatively connected with the throttle valve whereby, when the service valve is opened, the pressure of gas is exerted on both sides of the actuating means equally until the pilot burner is ignited, the ignition of which actuates the thermal element to close the throttle valve and reduce the pressure in one chamber to permit the main valve to be opened by pressure in the other chamber, the heating effect of the pilot burner under its throttled gas supply being insufficient to maintain a maximum throttling effect on the gas supply to the pilot burner and the connected chamber whereby the pressure therein will be increased and the differential of gas pressure on the opposite sides of the valve actuating means reduced to a degree sufficient only to hold the main valve open but insufficient to open the main valve once it closes.

9. In a fluid fuel control means, a fuel flow control valve having inlet and outlet ports, a diaphragm actuated valve within the flow control valve, spring means for biasing said control valve toward closed position, said control valve having chambers adjacent each side of the diaphragm, conduit means connecting the inlet port and both of said chambers, throttle valve means connected in the conduit means leading to the second of the chambers to reduce the pressure in said second chamber to permit the valve to open from pressure in the first chamber, and regulator means in connection with the conduit leading to the first chamber for restricting the passage of fuel under pressure into the first chamber to a greater extent than its passage outward is restricted upon removal of fuel pressure, whereby the valve will close faster than it will open to quickly set up a difference of pressure between the inlet and outlet ports.

10. In a fluid fuel burner, a supply line, a control valve, means for normally maintaining the valve in closed position, valve actuating means mounted in connection with the control valve and yieldable under a differential of pressure upon opposite sides of the actuating means to open the valve, means for conducting fuel under pressure from the supply line directly to one side of the actuating means and to the other side thereof, means for relieving fuel pressure on said other side of the actuating means for causing a differential of pressure on opposite sides thereof, said means comprising a throttling valve for controlling the supply of fuel to said other side of the actuating means, a pilot burner feeding from the discharge side of the throttling valve, and a thermal element disposed so as to be subject to heat from the pilot burner and operatively connected with said throttling valve.

11. In a control means for gas burners, a main valve, a pilot burner, valve actuating means mounted in connection with the main valve and yieldable under a differential of pressure upon opposite sides of the actuating means to open the valve, a pair of conduit means for conducting gas from a supply line directly to one side of the valve actuating means and simultaneously to the other side of the valve actuating means and said pilot burner, a throttling means connected in series in the conduit leading to said other side of said valve actuating means and said pilot burner, said throttle means being thermally responsive to the temperature of said pilot burner.

12. In a fluid fuel control device, a supply line, a diaphragm actuated main valve, conduit means for conducting fluid fuel pressure to a pressure chamber on one side of the diaphragm for holding the valve in closed position, a bleed passageway for bleeding pressure from said conduit means, a thermostatically controlled throttling valve responsive to the heat of a pilot burner and connected into said conduit means ahead of said bleed passageway for throttling the pressure of fuel fed to said pressure chamber whereby pressure may be removed from said pressure chamber through said bleed passageway faster than it is supplied through said throttle valve, and means responsive to pressure in the supply line for applying opening pressure to said main valve.

JOHN C. ENGLISH.